(12) United States Patent
Gall et al.

(10) Patent No.: US 10,731,028 B2
(45) Date of Patent: Aug. 4, 2020

(54) COLORED COMPOSITE MATERIAL WITH CELLULOSE FIBERS

(71) Applicant: Ford Global Technologies, LLC, Dearborn, MI (US)

(72) Inventors: Richard Gall, Ann Arbor, MI (US); Paul Kenneth Dellock, Northville, MI (US); Stuart Salter, White Lake, MI (US); Talat Karmo, Waterford, MI (US); LaRon Michelle Brown, Detroit, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 174 days.

(21) Appl. No.: 15/833,439

(22) Filed: Dec. 6, 2017

(65) Prior Publication Data

US 2019/0169401 A1    Jun. 6, 2019

(51) Int. Cl.
| | | |
|---|---|---|
| *C08L 23/02* | (2006.01) | |
| *C08L 1/02* | (2006.01) | |
| *C08L 91/00* | (2006.01) | |
| *C08J 5/10* | (2006.01) | |
| *C08J 5/04* | (2006.01) | |
| *C08L 101/00* | (2006.01) | |
| *C08K 3/34* | (2006.01) | |

(Continued)

(52) U.S. Cl.
CPC . *C08L 1/02* (2013.01); *C08J 3/22* (2013.01); *C08J 5/045* (2013.01); *C08J 5/10* (2013.01); *C08K 3/34* (2013.01); *C08L 91/00* (2013.01); *C08L 101/00* (2013.01); *B29B 7/42* (2013.01); *B29K 2001/00* (2013.01); *B29K 2023/12* (2013.01); *B29K 2105/0005* (2013.01); *B29K 2105/0032* (2013.01); *C08J 2301/02* (2013.01); *C08J 2323/02* (2013.01); *C08J 2423/12* (2013.01); *C08K 3/04* (2013.01); *C08K 3/346* (2013.01); *C08K 5/09* (2013.01); *C08K 5/14* (2013.01); *C08L 23/02* (2013.01); *C08L 2205/16* (2013.01)

(58) Field of Classification Search
None
See application file for complete search history.

(56) References Cited

U.S. PATENT DOCUMENTS

| | | |
|---|---|---|
| 8,530,548 B2 | 9/2013 | Hansen et al. |
| 8,585,817 B2 | 11/2013 | Lee et al. |

(Continued)

FOREIGN PATENT DOCUMENTS

| | | | |
|---|---|---|---|
| JP | 2011231237 | | 11/2011 |
| JP | 2011231237 | A * | 11/2011 |

OTHER PUBLICATIONS

Ammar, O. et al., "Talc as Reinforcing Filler in Polypropylene Compounds: Effect on Morphology and Mechanical Properties". Polym. Sci. 2017, 3(1:8), 1-7. (Year: 2017).*

(Continued)

*Primary Examiner* — Richard A Huhn

(74) *Attorney, Agent, or Firm* — David Coppiellie; Carlson, Gaskey & Olds, P.C.

(57) ABSTRACT

A material includes a base polymer, cellulose fibers dispersed through the base polymer, a pigment coloring the base polymer and the cellulose fibers, and a sealant selected from epoxidized soybean oil and polyolefin. The sealant coats and seals the cellulose fibers.

11 Claims, 1 Drawing Sheet

(51) Int. Cl.
*C08J 3/22* (2006.01)
*C08K 5/14* (2006.01)
*C08K 3/04* (2006.01)
*C08K 5/09* (2006.01)
*B29B 7/42* (2006.01)
*B29K 1/00* (2006.01)
*B29K 23/00* (2006.01)
*B29K 105/00* (2006.01)

(56) References Cited

U.S. PATENT DOCUMENTS

| | | |
|---|---|---|
| 2003/0004233 A1 | 1/2003 | Yamaguchi et al. |
| 2008/0293851 A1 | 11/2008 | Espino et al. |
| 2013/0207295 A1 | 8/2013 | Cernohous et al. |

OTHER PUBLICATIONS

Pracella, M. et al. "Functionalization, Compatibilization and Properties of Polyolefin Composites with Natural Fibers". Polymers 2010, 2, 554-574. (Year: 2010).*

Yang, H-S. and Gardner, D.J. (2011). Mechanical properties of cellulose nanofibril-filled polypropylene composites. Wood and Fiber Science, 43(2). p. 143-152.

* cited by examiner

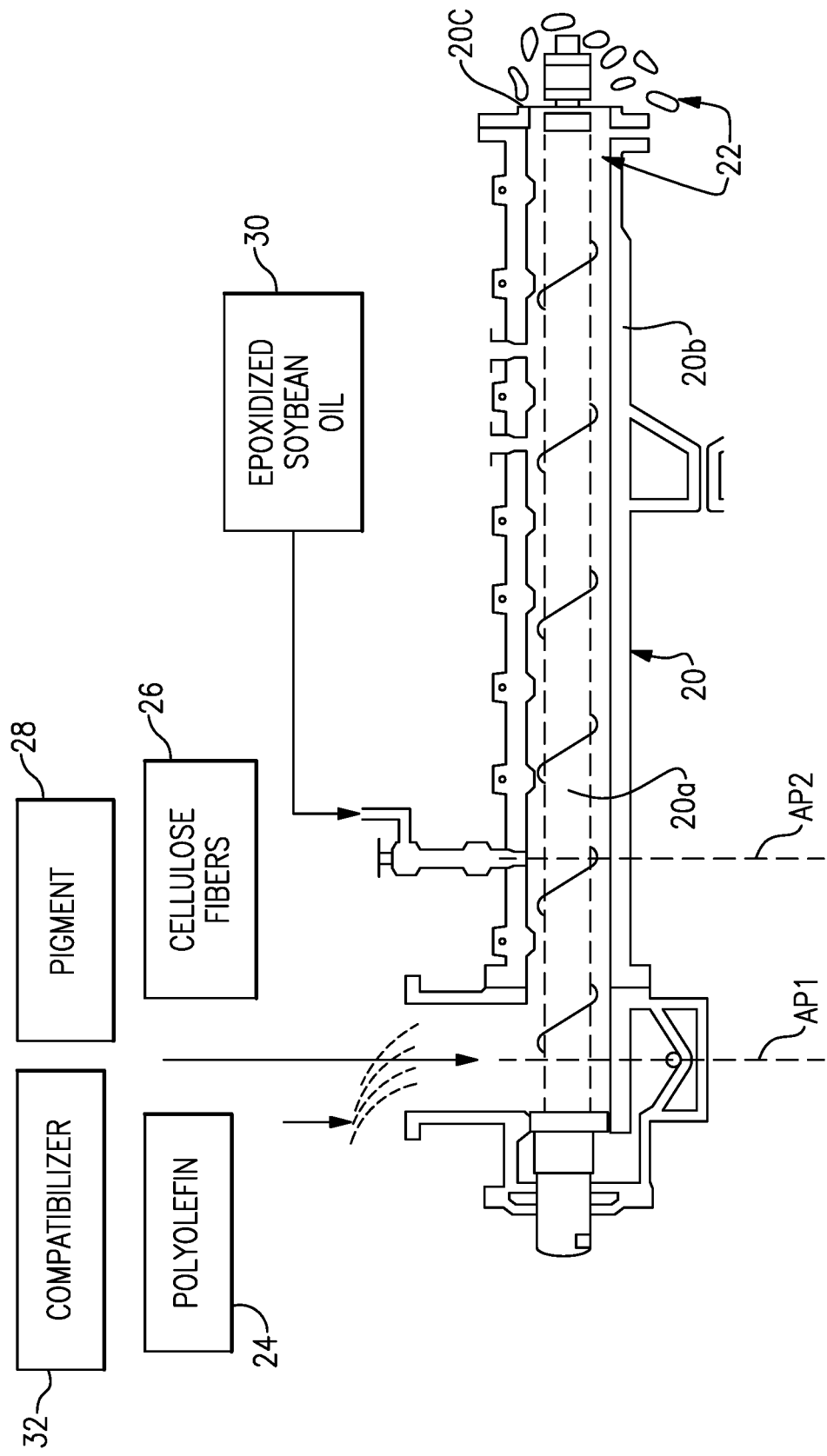

COLORED COMPOSITE MATERIAL WITH CELLULOSE FIBERS

BACKGROUND

Polymer materials are used in the automotive industry and elsewhere, particularly for components with high aesthetic requirements. Compositions of polymer materials typically include a base polymer and additives, such as fiber reinforcement, fillers, stabilizers, flame retardants, and colorants that modify the properties of the base polymer.

Cellulose fibers are of interest for incorporation into polymer materials. Cellulose fibers generally have low density, good physical properties, and low cost. However, cellulose fibers also have characteristics that limit their use. For example, cellulose fibers readily absorb moisture, which is detrimental in exterior applications, and can reduce strength of the polymer material. Cellulose fibers also have a bright white color. In colored polymer materials (non-white) for molded-in color applications, the white color of the cellulose fibers degrades the colored aesthetic appearance. Accordingly, use of cellulose fibers in colored polymer materials has been limited.

SUMMARY

A material according to an example of the present disclosure includes a base polymer, cellulose fibers dispersed through the base polymer, a pigment coloring the base polymer and the cellulose fibers, and a sealant selected from epoxidized soybean oil and polyolefin. The sealant coats and seals the cellulose fibers.

In a further example according to this disclosure, the material includes at least 25% by weight of a polyolefin base polymer, at least 40% by weight of cellulose fibers dispersed through the polyolefin base polymer, at least 5% of a pigment, the pigment coloring the base polymer and the cellulose fibers, and at least 1% of the sealant.

A method of making a material according to an example of this disclosure includes loading at least a base polymer, cellulose fibers, and a pigment into a mixer that includes a worm gear. The worm gear rotates to pre-mix the base polymer, the cellulose fibers, and the pigment. The loading is at a first axial position of the worm gear. A sealant is then loaded into the mixer at a second axial position of the worm gear that is downstream of the first axial position. The sealant is selected from epoxidized soybean oil and polyolefin. The worm gear mixes the epoxidized soybean oil with the pre-mixture of the base polymer, the cellulose fibers, and the pigment to form a final mixture. The final mixture is then extruded through a die.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 illustrates a polymer material that has cellulose fibers and a process for making the material.

DETAILED DESCRIPTION

FIG. 1 will be used to describe a material and a process for fabricating that material, namely a polymer composite material. FIG. 1 depicts an example of a mixer 20 for making a polymer material 22. The polymer material 22 at least includes a base polymer 24, cellulose fibers 26, a pigment 28, and a sealant 30, selected from epoxidized soybean oil (ESO) and polyolefin. As will be appreciated, the polymer material 22 can further include other additives, such as but not limited to, one or more compatibilizers 32.

As examples, the base polymer 24 may be a polyolefin. Example polyolefins may include polypropylene co- or homo-polymers, polypropylene block co-polymers, polyethylene, thermoplastic olefin (TPO), or thermoplastic elastomer (TPE). Other types of base polymers 24 may also be used, but such use may be subject to compatibility between the cellulose fibers and ESO 30 with the type of base polymer 24.

The polymer material 22 can be used as a masterbatch to color another, corresponding host polymer material. A masterbatch typically has concentrated amounts of colorant or other additive and is mixed with uncolored or differently colored polymer material of the same base polymer in an extrusion/compounding process. Of course, the composition of the polymer material 22 as a masterbatch can be selected in accordance with the target composition of the end-use material.

In general, the various constituents of the composition of the polymer material 22 are loaded into the mixer 20 to mix and disperse through the base polymer 24. In this regard, the mixer 20 includes a worm gear 20a within a housing 20b. The housing 20b may include one or more heating elements to heat the interior of the housing to soften or melt the base polymer 24 and facilitate mixing. Mixers such as a California pellet mill may be used, but other types of mixers may be used as well.

Most of the constituents of the composition of the polymer material 22 are loaded at axial position AP1 along the worm gear 20a. For reasons that will be explained, the sealant 30 is loaded at axial position AP2, which is downstream from axial position AP1 with regard to the movement of the constituents along the worm gear 20a. Thus, in this example, the rotating worm gear 20a initially pre-mixes the base polymer 24, the cellulose fibers 26, the pigment 28, and any other additives such as the compatibilizer 32 along a length of the worm gear 20a prior to introduction of the sealant 30.

The worm gear 20a mixes all of the constituents, including the sealant 30, to form the final polymer material 22. In this example, the polymer material 22 is extruded though a die 20c, after which it is cut into pellets.

The pigment 28 colors the base polymer 24. For example, for black color, the pigment may include carbon black and/or carbon black derivatives. The pigment 28 also colors the cellulose fibers 26. That is, since the pigment 28 colors both the base polymer 24 and the cellulose fibers 26, the base polymer 24 and the cellulose fibers 26 are the same color and the cellulose fiber 26 thus visually blend in with the base polymer 24.

Notably, the pigment 28 and the cellulose fibers 26 are able to mix upstream in the mixer 20 before reaching axial position AP2 where the sealant 30 is loaded into the mixer 20. This allows the pigment 28 to mix with, and color, the cellulose fibers 26 prior to introduction of the sealant 30, which may otherwise hinder coloring of the cellulose fibers 26.

The sealant 30 coats and seals the cellulose fibers 26 after the fibers are colored with the pigment 28. The coating of sealant 30 acts as a dispersant agent to facilitate uniform dispersion of the cellulose fibers 26 through the base polymer 24. The coating of sealant 30 is also hydrophobic, and thus repels water to provide sealing and reduce the tendency of the cellulose fibers 26 to absorb moisture. Finally, the coating of sealant 30 can also serve as a compatibilizer. For example, the sealant 30 enables polyolefin, such as polypropylene, to chemically bond to the cellulose.

The sealant 30 may be ESO (e.g., CAS No. 8013-07-8), polyolefin from a dispersion mixture, or mixtures of polyolefin and ESO. An example of the polyolefin dispersion is an aqueous acid-modified ethylene copolymer based polyolefin dispersion. One example of such a polyolefin dispersion is known as HYPOD™ 4501 Polyolefin Dispersion from Dow Chemical. The polyolefin dispersion can be water-based and include one or more ethylene-based copolymers, as well as stabilizers. The dispersion provides the performance benefits of polyolefin while also allowing use of water-based applications techniques. Both ESO and polyolefin coatings provide a good balance of properties, including heat sealability, moisture resistance/barrier, elasticity, adherence to polar substrates, low temperature flexibility, chemical resistance, and compatibility with the pigment 28.

The amounts of the constituents of the polymer material 22 may be selected in accordance with use as a masterbatch, in which case the composition would be selected to compliment a host polymer material such that upon mixing, the end-use material has a desired composition for the end-use part. Alternatively, the polymer material 22 could be used as a stand-alone material, in which case instead of mixing with a host material the polymer material 22 would directly be used to mold an end-use part. Compositions disclosed herein below may thus be directed to a masterbatch, a stand-alone material, or an end-use molded part which may be a product of molding the masterbatch or stand-alone material.

Generally, the masterbatch will have higher amounts of the cellulose fibers 26, the pigment 28, and the compatibilizer 32 than is desired in the end-use because the amounts will be "diluted" when mixed with a host polymer material and then molded into the end-use shape. Similarly, the amount of base polymer 24 in the masterbatch may be lower than desired for the end use because additional polymer will be added when mixed with the host polymer material.

In one example composition of a masterbatch, the polymer material 22 has at least 25% by weight of the base polymer 24, at least 40% by weight of the cellulose fibers 26, at least 5% of the pigment 28, and at least 1% of the sealant 30, such as the ESO and/or polyolefin dispersion.

For more complete coating of the cellulose fibers 26, a higher amount of sealant 30 can be used in place of a portion of the base polymer 24. For instance, an amount of at least 5% by weight facilitates enhanced dispersing, sealing, and or bonding of the cellulose fibers 26. For full or substantially full coating of the cellulose fibers 26, an amount of 10% by weight of the sealant 30 can be used, to further enhance dispersing, sealing, and or bonding of the cellulose fibers 26. Amounts higher than 10% can also be used, however, greater amounts may begin to reduce stiffness and increase ductility. If reduced stiffness and increased ductility are of concern for a particular end-use, the amount of sealant 30 can be limited to the amount that is sufficient to fully or substantially fully coat the cellulose fibers 26, which can be verified experimentally by microscopic analysis based on the amounts or ratios disclosed herein.

For the polyolefin dispersion, the above percentages are based on a solids content of approximately 40-44% in the dispersion and, unless stated otherwise herein, it is to be understood that the disclosed percentages of sealant 30 used may be scaled with lower or higher solids content in the dispersion. That is, the water of the dispersion is ultimately lost by evaporation and does not contribute or substantially contribute to the composition of the polymer material 22. This is different than the ESO, in which all or substantially all of the ESO added at AP2 is incorporated into the polymer material 22.

For instance, for a polyolefin dispersion that has 40% by weight solids content, a loading of 10% by weight of the dispersion at position AP2 would yield 4% by weight of the polyolefin (including any stabilizers and other solids) coating on the cellulose fibers 26 in the polymer material 22. Likewise for 40% solids content, a 1% loading at AP2 would yield 0.4% in the polymer material 22 and a 5% loading at AP2 would yield 2% in the polymer material 22. At 44% solids content, a 1% loading of the dispersion at AP2 would yield 0.44% in the polymer material 22, a 5% loading at AP2 would yield 2.2% in the polymer material 22, and a 10% loading at AP2 would yield 4.4% in the polymer material 22. In further examples, the amount of dispersion added at AP2, the solids content in the dispersion, or both are selected such that the polymer material has up to 10% by weight of the polyolefin (including any stabilizers and other solids) coating on the cellulose fibers 26. Overall, a solids content of 40-44% in the dispersion thus yields 0.4-4.4%, which can be adjusted up to 10% to alter performance if desired, of the polyolefin (including any stabilizers and other solids) coating on the cellulose fibers 26 in the polymer material 22.

The amount of sealant 30 can also be selected with respect to the amount of cellulose fibers 26. For instance, in the composition of the polymer material 22, the ratio of the weight percentage of cellulose fibers 26 to the weight percentage of sealant 30 is from 2:1 up to 15:1. More preferably, for enhanced, full, or substantially full coating, the ratio is from 3:1 to 10:1. In one further example, the ratio is from 4:1 to 6:1. Again, if the polyolefin dispersion is used, it is to be understood that these examples are based on the weight percentage of the dispersion added, assuming the dispersion has 40-44% solids, and that the example ratios can be scaled with lower or higher solids content in the dispersion.

The master batch may have 40% of the cellulose fibers 26 but higher amounts may be used as well. In further examples, the polymer material 22 has at least 45% by weight of the cellulose fibers 26, at least 35% by weight of the base polymer 24, and at least 7% by weight of the pigment 28.

The more "compatible" the cellulose fibers 26 are with the base polymer 24, the better the cellulose fibers 26 will bond to the base polymer 24. To enhance bonding, one or more compatibilizers 32 may be used. The percentages of compatibilizer 32 are typically much lower than the other constituents. Example compatibilizers include, but are not limited to, dicumyl peroxide, maleic anhydride, or combinations thereof. For instance, the polymer material 22 as a masterbatch may include approximately 0.5% by weight of dicumyl peroxide and approximately 1% by weight of maleic anhydride.

Dicumyl peroxide serves to make the ESO 30 more reactive by adding oxygen molecules to its surface that can react and bond with the base polymer 24, such as polypropylene. The peroxide reacts according to Reaction I below, thereby adding free oxygen molecules to already reactive ESO 30, which will enable it to readily link to the base polymer 24. A similar reaction is expected for use of the polyolefin.

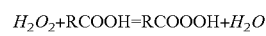

$H_2O_2 + RCOOH = RCOOOH + H_2O$     Reaction I:

The maleic anhydride is a coupling agent that increases bonding between the cellulose fibers 26 and the base polymer 24. Maleic anhydride strongly reacts with the oxygen rich sealant 30 and polypropylene or other base polymer to facilitate improvement of impact strength, flexural modulus, tensile strength, and heat deflection temperature of the end-use product. Table I below lists further example compositions of the polymer material 22, wherein the polyolefin dispersion can be fully or partially substituted for the ESO, again assuming in these examples that the dispersion has 40-44% solids content and that the percentages in Table I can be scaled with lower or higher solids content in the dispersion.

TABLE I

| Composition No. | Polypropylene (wt %) | Epoxidized Soybean Oil (wt %) | Cellulose fiber (wt %) | Black Pigment (wt %) | Maleic Anhyride (wt %) | Dicumyl Peroxide (wt %) |
|---|---|---|---|---|---|---|
| 1 | 38.5 | 5 | 47 | 8 | 1 | 0.5 |
| 2 | 33.5 | 10 | 47 | 8 | 1 | 0.5 |

As can be appreciated, once the polymer material 22 is used as a masterbatch and mixed with a host polymer material, the composition of the end use material will depend on the compositions of the polymer material 22 and the host polymer material. As an example, the end-use composition may be one part masterbatch polymer material 22 and four parts host polymer material. In such an example, assuming a host polymer material that has only base polymer, the percentages of the cellulose fibers 26 and pigment 28 (from the masterbatch) in the end-use material will be lower than in the masterbatch by a factor of five. Of course, if the host polymer material includes additives, such as talc or other filler, the calculation may change. Most typically, the percentages of the cellulose fibers 26, pigment 28, or other additives in the end-use material will be lower than in the masterbatch by a factor of at least three.

In some instances, the cellulose fibers 26 may be used to reduce the weight percentage of one or more other fillers. As an example, as existing part may use a polypropylene with 40% by weight of talc. Talc is denser and more costly than cellulose fibers. A controlled percentage of the cellulose fibers 26 can be used to replace a portion of the talc in the formulation, thereby lowering overall density and lowering overall cost, without substantially sacrificing physical properties or appearance.

In compounding the masterbatch polymer material 22 with a host polymer material, the masterbatch polymer material 22 may be loaded into the extruder downstream of the location where the host polymer material is loaded. For instance, midway in the compression section of the extruder the host polymer material is melted and, when the polymer material 22 is loaded at such a location, there is adequate length remaining in the extruder to assure the polymer material 22 is thoroughly mixed with the host polymer material prior to either injection molding a part or making pellets that can be used by a molder.

The polymer material 22 permits the cellulose fibers 26 to be used in colored applications. Adding the pigment 28 colors the base polymer 24 and the cellulose fibers 26, thereby "hiding" the cellulose fibers 26 when molded into an end-use shape. The pigment 28 thus prevents the cellulose fibers 26 from whitening the surface of a molded part if the cellulose fibers 26 migrate to the surface. Coating the cellulose fibers 26 with the sealant 30 also seals the cellulose fibers 26 against moisture and facilitates making the cellulose fibers 26 compatible with the base polymer 24 by strengthening bonding. The compatibilizers 32 increase reactivity of the sealant 30, thereby making the sealant 30 even more compatible with the base polymer 24 so that the use of the cellulose fibers 26 does not sacrifice strength or other physical properties. Additionally, cellulose fibers and soy oil are renewable resources, and the polymer material 22 is thus environmentally friendly.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A material comprising:
   at least 25% by weight of a base polymer;
   at least 40% by weight of cellulose fibers dispersed through the base polymer;
   at least 5% by weight of a pigment coloring the base polymer and the cellulose fibers; and
   at least 5% by weight of a sealant selected from the group consisting of epoxidized soybean oil and polyolefin, the sealant coating and sealing the cellulose fibers.

2. The material as recited in claim 1, wherein the base polymer is polyolefin.

3. The material as recited in claim 1, further comprising reinforcement particles dispersed in the base polymer.

4. The material as recited in claim 1, further comprising a compatibilizer selected from the group consisting of dicumyl peroxide, maleic anhydride, and combinations thereof.

5. A material comprising:
   at least 25% by weight of a polyolefin base polymer;
   at least 40% by weight of cellulose fibers dispersed through the polyolefin base polymer;
   at least 5% by weight of a pigment, the pigment coloring the base polymer and the cellulose fibers; and
   a sealant selected from the group consisting of epoxidized soybean oil, polyolefin, and combinations thereof, wherein for the epoxidized soybean oil the material comprises at least 1% by weight of the epoxidized soybean oil and for the polyolefin the material comprises at least 0.4% by weight of the polyolefin.

6. The material as recited in claim 5, wherein the sealant comprises at least 5% by weight of the epoxidized soybean oil or at least 2% by weight of the polyolefin.

7. The material as recited in claim 6, wherein the material comprises at least 45% by weight of the cellulose fibers and least 35% by weight of the polyolefin base polymer.

8. The material as recited in claim 7, wherein the material comprises at least 7% by weight of the pigment.

9. The material as recited in claim 5, further comprising a compatibilizer selected from the group consisting of dicumyl peroxide, maleic anhydride, and combinations thereof.

10. A method of fabricating the material as recited in claim 1, comprising:
   loading at least the base polymer, the cellulose fibers, and the pigment into a mixer that includes a worm gear, the worm gear rotating to pre-mix the base polymer, the cellulose fibers, and the pigment, wherein the loading is at a first axial position of the worm gear;
   loading the sealant into the mixer at a second axial position of the worm gear that is downstream of the first axial position, the worm gear mixing the sealant with the pre-mixture of the base polymer, the cellulose fibers, and the pigment to form a final mixture, wherein the sealant is selected from the group consisting of epoxidized soybean oil and polyolefin; and
   the worm gear extruding the final mixture through a die.

11. The method as recited in claim 5, further comprising loading a compatibilizer into the mixer at the first axial position with the base polymer, the cellulose fibers, and the pigment, the compatibilizer selected from the group consisting of dicumyl peroxide, maleic anhydride, and combinations thereof.

* * * * *